July 9, 1929. D. B. BRADNER ET AL Re. 17,365

PROCESS AND APPARATUS FOR DISPERSING IRRITANTS

Original Filed Feb. 7, 1925

Nicholas E. Oglesby,
Donald B. Bradner INVENTORS.

BY Chas. Silver
ATTORNEY.

Reissued July 9, 1929. Re. 17,365

UNITED STATES PATENT OFFICE.

DONALD B. BRADNER, OF HAMILTON, OHIO, AND NICHOLAS E. OGLESBY, OF EDGEWOOD, MARYLAND, ASSIGNORS, BY MESNE ASSIGNMENTS, TO FEDERAL LABORATORIES, INC., OF PITTSBURGH, PENNSYLVANIA, A CORPORATION OF DELAWARE.

PROCESS AND APPARATUS FOR DISPERSING IRRITANTS.

Original No. 1,695,228, dated December 11, 1928, Serial No. 7,594, filed February 7, 1925. Application for reissue filed May 21, 1929. Serial No. 364,923.

This invention relates to a process and apparatus for dispersing irritants and has more specific application to the dispersion of irritants in small portable fire-arms.

Among the objects of this invention is to provide a process and apparatus whereby an irritating material may be dispersed thru a small fire-arm by the heat and pressure of propellant gases.

A further object of this invention is to provide a cartridge which may be used in small portable fire-arms, the cartridge being provided with a propelling charge and also irritating material, with or without an explosive charge associated therewith.

A further object of this invention is to provide a process and apparatus whereby an irritant, for example chloracetophenone, may be readily dispersed without the use of elaborate, heavy or otherwise cumbersome apparatus.

Other, further and more specific objects of the invention will become readily apparent to persons skilled in the art from a consideration of the following description when taken in conjunction with the accompanying drawing.

This invention finds special application as a substitute for the ammunition now employed in the ordinary small fire-arm. In practicing this invention, an irritant is substituted for the shot or other metallic projectile of the cartridge and is propelled by the heat and pressure of the gases evolved from a propellant. This propellant is fired with the ordinary firing means provided in cartridges.

Ammunition of this character is readily portable and may be inserted in the weapon in an instant when occasion arises for its use. This ammunition is of small weight, small bulk, simple and safe to use. It does not require the practice or instruction necessary with the ordinary type of ammunition and is valuable for military purposes.

The concentration of irritant in the enclosure may be regulated at will. The dispersion of irritants such as heretofore described is very great and the irritant will penetrate into places that would be difficult or impossible to reach with the ordinary types of ammunition.

Reference is to be had to the accompanying drawings wherein there are illustrated certain specific embodiments of this invention.

Figure 1:
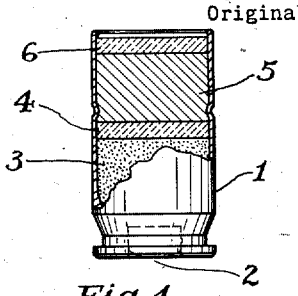
Fig. 1 is a side view of a .45 caliber automatic pistol cartridge, wherein an irritant has been substituted for the bullet of the cartridge, a portion of the device being broken away to illustrate the interior construction thereof.

The pistol cartridge shown in Fig. 1 comprises a brass casing (1) and primer (2) above which is placed a powder charge (3) at one end of the compartment formed by the casing (1). The primer and powder charge are preferably the usual charges in approved service ammunition, the primer consisting of potassium chlorate, antimony sulphide, and sulphur, and the powder charge being nitrocellulose. Above the powder charge (3) is placed a wad (4) of fibrous material, such as cotton, and this wad is sealed in place by sealing material, preferably paraffin. Above this wad (4) the quantity of irritant (5), for example chloracetophenone, is placed and this is secured in position by means of a wad (6), similar to wad (4), which is also sealed in position like the wad (4). When this cartridge is placed in a pistol, by firing the primer (2) the powder charge (3) will be set off and the heat and pressure produced thereby will propel the irritant (5) thru the barrel of the pistol and the irritant will then become dispersed in the air.

Figure 2:
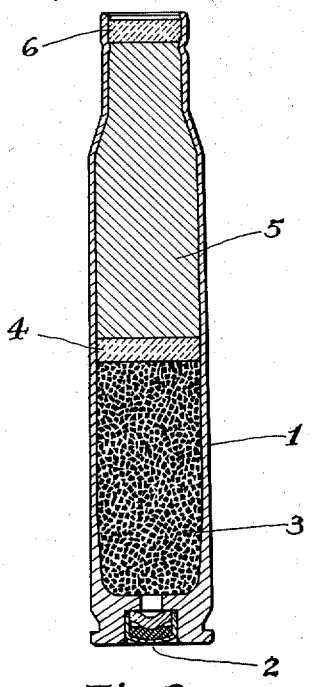
Fig. 2 is a vertical section thru a rifle cartridge wherein an irritant is substituted for the bullet of the cartridge.
Figure 3:
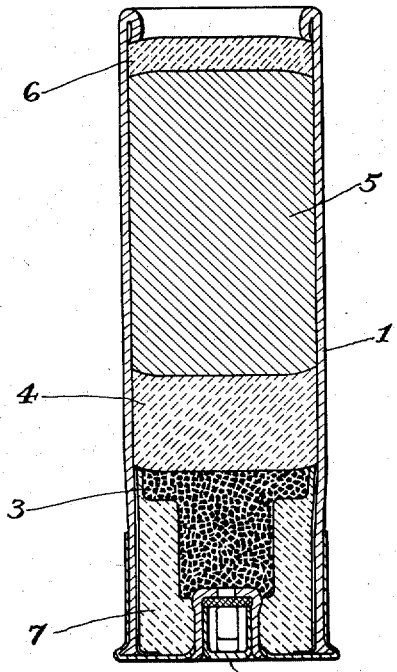
Fig. 3 is a vertical section thru a shot-gun cartridge wherein an irritant has been substituted for the bullet of the cartridge.

In the devices shown in Figs. 2 and 3, the powder charge (3) and irritant (5) are sealed in position similar to that in Fig. 1. In Fig. 3, the powder charge (3) is separated from the casing (1) of the cartridge by a base wad (7) of compressed paper.

Figure 4:
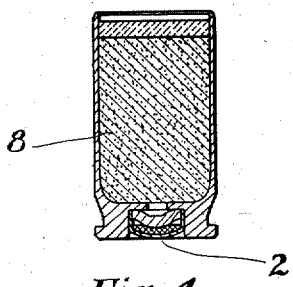
Fig. 4 is a view similar to Fig. 1, showing an adaptation of this invention to mixtures of the irritant and the explosive. For purposes of illustration a pistol cartridge is shown, but the same principle may be appropriated in a rifle cartridge or shot-gun cartridge within the spirit and scope of this invention.

In Fig. 4, which also shows a .45 caliber automatic pistol cartridge, the powder charge and the irritant are shown as a mixture (8). By firing the primer (2), the powder mixture will be set off, creating heat and pressure and will be forced out of the barrel of the gun carrying the irritant with it. With devices such as shown in Figs. 1 to 4, the dispersion of irritant takes place at the muzzle of the gun.

Figure 5:
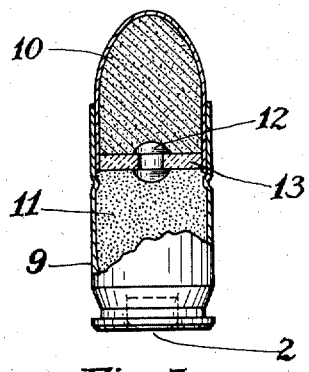
Fig. 5 is a side view showing a pistol cartridge with a bullet-shape container wherein this invention is employed, a portion of the device being broken away to show the interior construction thereof. Here also a piston cartridge is illustrated, but the same principle may be applied to a rifle cartridge.

In the device shown in Fig. 5, the .45 caliber automatic pistol cartridge comprises the two portions (9) and (10). The portion (9) is the usual casing of the service cartridge and contains a propelling charge (11). The bullet-shape container (10) is preferably the cupronickel shell of the service bullet, and contains the irritant which may be intimately mixed with an explosive or fuel, or a core of a bursting charge surrounded by the irritant may be used. The materials in the two compartments (9) and (10) are separated by a partition in which is a time fuse (12), and which is in contact with the substances in each of these compartments. A wad (13) of suitable material also separates the materials in the compartments formed by the casing (9) and (10).

When this bullet is placed in a small firearm such as a pistol, by firing the primer (2), the propelling charge is set off and the heat and pressure produced thereby propels the compartment (10) and its contents from the barrel of the pistol. The flash of the propelling charge ignites the fuse or pellet (12), which is so timed as to set off the explosive or fuel in the mixture, or else the bursting charge surrounded by the irritant, when the latter type is employed, at a predetermined time after the container (10) and its contents have been fired from the pistol. The bursting of the container by the explosive, or the burning of the fuel disperses the irritant, and the dispersion of the irritant may occur at a distance from where the cartridge is fired.

Altho chloracetophenone is illustrated as the preferred irritant in these devices, there may be also used other irritants such as diphenylaminechlorarsine, diphenylchlorarsine, other halogen derivatives of acetophenone such as bromacetophenone or iodoacetophenone, etc. These irritants should be solid at ordinary temperature and melt at 20–400° C. The solid organic irritants with melting points of 35–150° C. are preferred. The propellant charge may be the usual charge in the service cartridge, and consisting of nitrocellulose powder. The explosive in devices such as shown in Fig. 5 may vary with the character of the irritant and the purpose for which the device is desired, but, in most cases, black powder or finely divided smokeless powder are preferred. Where a fuel rather than an explosive is used to disperse the irritant, smokeless powder is preferred.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A cartridge for fire-arms containing a primer, a propellent powder, and an immediately dispersable gas-generating chemical, said chemical arranged to be projected and immediately dispersed by the released energy of the propellent powder upon the firing of the cartridge.

2. A cartridge for small fire-arms containing a primer, a propellent powder adjacent said primer, a fuming, blinding, and disabling gas-generating chemical intimately mixed with a portion of said powder and in direct contact with the powder adjacent the primer, and a moisture-proof seal closing said cartridge.

3. A cartridge for fire-arms containing a primer, a propellant powder and a halogen derivative of acetophenone arranged to be projected and immediately dispersed by the released energy of the propellant powder upon the firing of the cartridge, and a seal closing said cartridge.

4. A cartridge for fire-arms containing a primer, a propellant powder and a charge of chloracetophenone arranged to be projected and immediately dispersed by the released energy of the propellant powder upon the firing of the cartridge, and a seal closing said cartridge.

DONALD B. BRADNER.
NICHOLAS E. OGLESBY.